United States Patent
Zeiler et al.

(10) Patent No.: US 11,536,610 B2
(45) Date of Patent: Dec. 27, 2022

(54) OPTICAL WAVEMETER

(71) Applicant: Keysight Technologies, Inc., Santa Rosa, CA (US)

(72) Inventors: Marcel Zeiler, Boeblingen (DE); Bernd Nebendahl, Ditzingen (JP)

(73) Assignee: Keysight Technologies, Inc., Santa Rosa, CA (US)

(*) Notice: Subject to any disclaimer, the term of this patent is extended or adjusted under 35 U.S.C. 154(b) by 192 days.

(21) Appl. No.: 16/943,056

(22) Filed: Jul. 30, 2020

(65) Prior Publication Data

US 2021/0131873 A1    May 6, 2021

Related U.S. Application Data

(60) Provisional application No. 62/928,704, filed on Oct. 31, 2019.

(51) Int. Cl.
  *G02B 6/293* (2006.01)
  *G01J 3/45* (2006.01)
  *G02B 6/12* (2006.01)

(52) U.S. Cl.
  CPC ............ *G01J 3/45* (2013.01); *G02B 6/12007* (2013.01); *G02B 6/29352* (2013.01); *G02B 2006/12038* (2013.01); *G02B 2006/12061* (2013.01); *G02B 2006/12138* (2013.01); *G02B 2006/12159* (2013.01)

(58) Field of Classification Search
  CPC ................ G02B 6/2935; G02B 6/29352
  See application file for complete search history.

(56) References Cited

U.S. PATENT DOCUMENTS

| | | | |
|---|---|---|---|
| 6,781,741 B2 | 8/2004 | Uesaka | |
| 6,823,094 B2 | 11/2004 | Goh et al. | |
| 8,406,580 B2 | 3/2013 | Takada et al. | |
| 9,104,085 B2 | 8/2015 | Wesstrom | |
| 10,145,731 B2 | 12/2018 | Qian et al. | |
| 2003/0021304 A1* | 1/2003 | Pezeshki | H01S 5/0687 385/39 |

FOREIGN PATENT DOCUMENTS

| | | |
|---|---|---|
| CN | 105826811 A | 8/2016 |
| CN | 106371261 A | 2/2017 |

(Continued)

OTHER PUBLICATIONS

English translation of CN106371261A.

(Continued)

*Primary Examiner* — Charlie Y Peng (57) ABSTRACT

A photonic integrated circuit (PIC) for determining a wavelength of an input signal is disclosed. The PIC comprises: a substrate; a first Mach-Zehnder Interferometer (MZI) disposed over the substrate, comprising first optical waveguides having a first optical path length difference, and configured to receive a first output optical signal from a light source. The PIC also comprises a second Mach-Zehnder Interferometer (MZI) disposed over the substrate, comprising second optical waveguides having a second optical path length difference, which is greater than the first optical path length difference, and configured to receive a second output optical signal from the light source.

19 Claims, 5 Drawing Sheets

(56) References Cited

FOREIGN PATENT DOCUMENTS

| JP | 08251105 A | * | 9/1996 | .......... G02B 6/12011 |
| WO | WO-03063515 A2 | * | 7/2003 | ............ H04L 27/223 |
| WO | 2017201548 A1 | | 11/2017 | |

OTHER PUBLICATIONS

Fabio Pavanello et al. "Broadband Digital Fourier Transform Spectrometer for On-Chip Wavelength Monitoring in the 2.3-μm Wavelength Range," IEEE Photonics Journal, vol. 11, No. 3, Jun. 2019, pp. 1-10.

Derek M. Kita et al., "High-performance and scalable on-chip digital Fourier transform spectroscopy," Nature Communications, 2018, DOI: 10.1038/s41467-018-06773-2 | www.nature.com/naturecommunications, pp. 1-7.

R. M. Oldenbeuving et al., "High precision wavelength estimation method for integrated optics," Optical Society of America, 2013, vol. 21, No. 14, DOI:10.1364/OE.21.017042, pp. 17042-17052.

Chao Xiang et al., Integrated chip-scale Si3N4 wavemeter with narrow free spectral range and high stability, Optic Letters, vol. 41, No. 14, Jul. 15, 2016, pp. 3309-3312.

Przemek J. Bock et al.,"Subwavelength grating Fourier-transform interferometer array in silicon-on-insulator," Laser Photonics Rev. 7, No. 6, L67-L70 (2013) / DOI 10.1002/lpor.201300063, pp. 67-70.

Babak Momeni et al., "Planar photonic crystal microspectrometers insilicon-nitride for the visible range," Optics Express, Sep. 14, 2009, vol. 17, No. 19, pp. 17060-17069.

"Keysight 86120D and 86122C Multi-Wavelength Meters—Data Sheet," Keysight Technologies, Dec. 1, 2016, pp. 1-8.

M. Muneeb et al., "Demonstration of Silicon-on-insulator midinfrared spectrometers operating at 3.8μm," Optics Express, May 20, 2013, vol. 21, No. 10, pp. 11659-11669.

"Tunable Laser Platform," Luna, Dec. 13, 2017, http://lunainc.com/phoenix, pp. 1-2.

S. N. Zheng et al., "On-chip Spectrometer Enhanced by Ring Resonator Cavity: High-resolution and Large-bandwidth," CLEO 2017©OSA2017, pp. 1-2.

English translation of CN105826811A, pp. 1-8.

* cited by examiner

OPTICAL WAVEMETER

CROSS-REFERENCE TO RELATED APPLICATIONS

This present application is claims priority under 35 U.S.C. § 119(e) from U.S. Provisional Application 62/928,704 filed on Oct. 31, 2019, which names Marcel Zeiler, et al. as inventors. The entire disclosure of U.S. Provisional Application 62/928,704 is specifically incorporated herein by reference.

BACKGROUND

Knowing the wavelength of an optical signal is important when analyzing a signal of an unknown optical source, but also when the output of a (tunable) laser source must be conditioned according to pre-defined parameters, e.g. the wavelength.

Optical wavemeters allow the measurement of a wavelength of an optical source, often a narrowband optical source such as a laser. These optical wavemeters have practical applications such as continuous or continual monitoring of the wavelength of an optical source. Additionally, optical wavemeters have application in optical spectrum analyzers or wavelength-meters to provide a way to measure the wavelength of a reference signal and thus increase the accuracy of the actual measurement.

Many known wavemeters are based on bulk optical components disposed on a benchtop. Such benchtop devices are comparatively expensive, require an undesirable amount of space for implementation, and have a comparatively limited update rate.

While photonic integrated circuits (PICs) have been leveraged for various types of optical measurements, known devices have certain drawbacks that encumber their use. For example, while certain known PIC wavemeter-designs can be used for applications that do not require wavelength measurements at multiple wavelengths, the usable wavelength range of these known devices is comparatively short. As a result, is not suitable to cover the wavelength range of many known desired applications, such as an optical communications wavelength band, which covers wavelengths, for example, from 1250 nm to 1650 nm. In addition, in certain known devices, the physical length of the waveguides required result in optical power losses that are unacceptable in many applications, such as the measurement of comparatively low-power optical signals.

What is needed, therefore, is an optical wavemeter that overcomes at least the shortcomings of known optical wavemeters discussed above.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element (e.g., an optical waveguide) is said to be connected to a second element (e.g., another optical waveguide), this encompasses cases where one or more intermediate elements or intervening devices may be employed to connect the two elements to each other. However, when a first element is said to be directly connected to a second element, this encompasses only cases where the two elements are connected to each other without any intermediate or intervening devices. Similarly, when a signal is said to be coupled to an element, this encompasses cases where one or more intermediate elements may be employed to couple the signal to the element. However, when a signal is said to be directly coupled to an element, this encompasses only cases where the signal is directly coupled to the element without any intermediate or intervening devices.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements" relationships to one another, as illustrated in the accompanying drawings. These relative terms are intended to encompass different orientations of the elements thereof in addition to the orientation depicted in the drawings. For example, if an apparatus (e.g., an optical wavemeter) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Various embodiments of an optical wavemeter are described herein.

In accordance with a representative embodiment, a photonic integrated circuit (PIC) for determining a wavelength comprises: a substrate; a first Mach-Zenhder Interferometer (MZI) disposed over the substrate, comprising first optical waveguides having a first effective index of refraction and configured to receive a first output optical signal from a light source; and a second Mach-Zehnder Interferometer (MZI) disposed over the substrate, comprising second optical waveguides having a second effective index of refraction, which is greater than the first effective index of refraction, and configured to receive a second output optical signal from the light source. The first MZI has a first optical path length (OPL) difference, and the second MZI has a second optical path length (OPL) difference, which is greater than the first OPL difference.

In accordance with another representative embodiment, an optical wavemeter for determining an optical wavelength of a light source is disclosed. The optical wavemeter comprises: a substrate; a first Mach-Zehnder Interferometer (MZI) disposed over the substrate, comprising first optical waveguides having a first optical path length (OPL) difference, and configured to receive a first output optical signal from a light source; and a second Mach-Zehnder Interferometer (MZI) disposed over the substrate, comprising second optical waveguides having a second OPL difference, which is greater than the first OPL difference, and configured to receive a second output optical signal from the light source. The optical wavemeter further comprises a controller comprising a memory that stores instructions, and a processor that executes the instructions. When executed by the processor, the instructions cause the controller to implement a process, comprising: comparing the first and second difference signals with first and second difference values stored in the memory, and, based on the comparing, determining an output wavelength of the light source.

In accordance with another representative embodiment, a (PIC) for determining a wavelength of an input signal is disclosed. The PIC comprises: a substrate; a first Mach-Zehnder Interferometer (MZI) disposed over the substrate, comprising first optical waveguides having a first optical path length difference, and configured to receive a first output optical signal from a light source. The PIC also comprises a second Mach-Zehnder Interferometer (MZI) disposed over the substrate, comprising second optical waveguides having a second optical path length difference, which is greater than the first optical path length difference, and configured to receive a second output optical signal from the light source.

Figure 1:
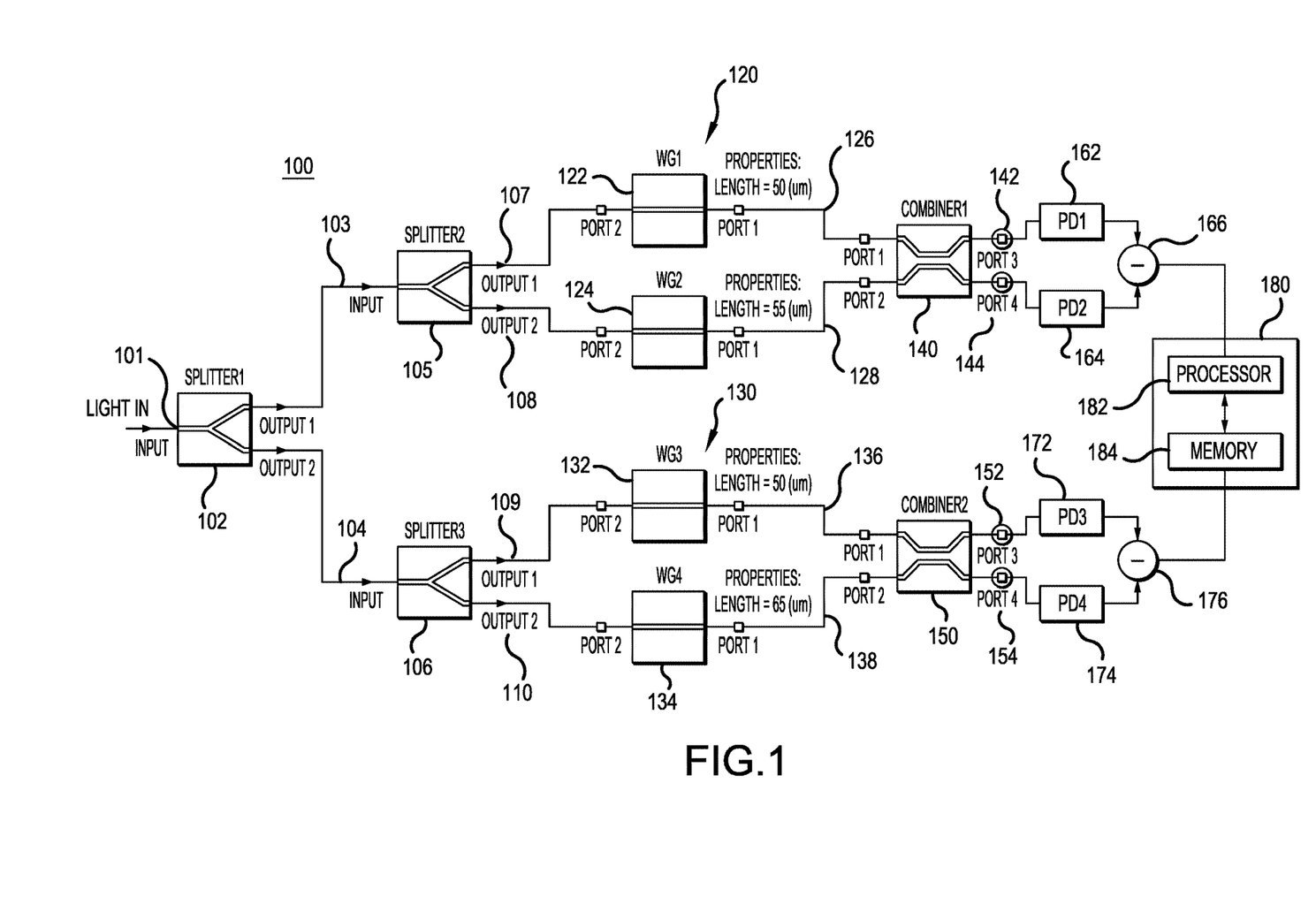
FIG. 1 is a simplified schematic diagram of an optical wavemeter an optical wavelength in accordance with a representative embodiment.

FIG. 1 is a simplified schematic diagram of a wavemeter 100, in accordance with a representative embodiment. As described more fully below, the wavemeter 100 is contemplated for instantiation as a photonic integrated circuit (PIC).

An input optical signal is provided to an input 101 as shown. A first optical splitter 102 is adapted to split the power of the input optical signal into a first optical signal 103 and a second optical signal 104, having equal power. As such, the first optical splitter is a 50:50 optical splitter.

The first optical signal 103 is then incident on a second optical splitter 105, and the second optical signal 104 is incident on a third optical splitter 106. Like the first optical splitter 102, the second and third optical splitters 105, 106 are each 50:50 splitters, and as such, the input optical signal is again equally split by the second and third optical splitters 105, 106. The second optical splitter 105 provides a first output optical signal 107 and a second output optical signal 108. Similarly, the third optical splitter 106 provides a third output optical signal 109 and a fourth output optical signal 110. As will be appreciated, neglecting power loss in optical waveguides and couplers, each of the first, second, third and fourth optical output signals have one-fourth of the optical power of the input optical signal provided to the input 101.

The first output optical signal 107 is received at a first port of a first arm 122 of a first Mach-Zehnder interferometer (MZI) 120; and the second output optical signal 108 is received at a second port of a second arm 124 of the first MZI 120.

Similarly, the third output optical signal 109 is received at a first port of a first arm 132 of a second Mach-Zehnder interferometer (MZI) 130; and the fourth output optical signal 110 is received at a second port of a second arm 134 of the second MZI 130.

The first MZI 120 has a first free-spectral range (FSR), and the second MZI 130 has a second free spectral range, which is different than the first FSR of the first MZI 120. As will be described more fully below, the FSRs of the first and second MZIs 120, 130 are realized by providing a first effective index of refraction for the first MZI 120, and a second effective index of refraction for the second MZI 130, which is not the same as the first effective index of refraction. In addition, or instead of the providing different effective indices of refraction, the first MZI 120 may have a first geometric optical length (i.e., physical length) and the second MZI 130 may have a second geometric optical length, which is different than the first geometric optical length. As described more fully below, the differing FSRs are used to determine a wavelength of the input optical signal.

A first output 126 and a second output 128 are provided from the first and second arms 122, 124 of the first MZI 120 to first and second inputs of a first signal combiner 140, which provides a first output 142 to a first photodetector 162 and a second output 144 to a second photodetector 164. The outputs of the first and second photodetectors 162, 164 are provided to a first subtractor 166. As shown, the output of the first subtractor 166, which is a difference signal (power) between the first and second photodetectors 162, 164 is provided as a first input to a controller 180, which comprises a processor 182 and a memory 184.

A first output 136 and a second output 138 are provided from the first and second arms 132, 134 of the second MZI 130 to first and second inputs of a second signal combiner 150, which provides a first output 152 to a first photodetector 172 and a second output 154 to a second photodetector 174. The outputs of the first and second photodetectors 172, 174 are provided to a second subtractor 176. As shown, the output of the second subtractor 176, which is a difference signal (power) between the first and second photodetectors 172, 174 is provided as a second input to the controller 180.

As described more fully below, the controller 180 is adapted to determine a wavelength of the input signal provided to the input 101 of the wavemeter 100.

As noted, the controller 180 comprises the processor 182, which is tangible and non-transitory, and is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 182 of the present teachings is an article of manufacture and/or a machine component. The processor 182 for the controller 180 is configured to execute software instructions to perform functions as described in the various embodiments herein. The processor 182 may be a general-purpose processor or may be part of an application specific integrated circuit (ASIC). The processor 182 may also be (or include) a microprocessor, a microcomputer, a processor chip, a controller, a microcontroller, a digital signal processor (DSP), a state machine, or a programmable logic device. The processor 182 may also be (or include) a logical circuit, including a programmable gate array (PGA) such as a field programmable gate array (FPGA), or another type of circuit that includes discrete gate and/or transistor logic. The processor 182 may be a central processing unit (CPU), a graphics processing unit (GPU), or both. Additionally, the processor 182 may comprise multiple processors, parallel processors, or both. Multiple processors may be included in, or coupled to, a single device or multiple devices.

The memory 184 may comprise a main memory or a static memory, or both, where the memories may communicate with each other via a bus (not shown). The memory 184 described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

Finally, and as will be appreciated, providing, in addition to the first MZI 120 and the second MZI 130, additional similarly configured MZIs (not shown in FIGS. 1-2), the FSRs of such additional MZIs can be determined. As will be appreciated more clearly as the present description continues, these additional MZIs and resultant FSRs will allow a greater resolution in the determination of the wavelength of the optical signal provided to the input 101.

Figure 2:
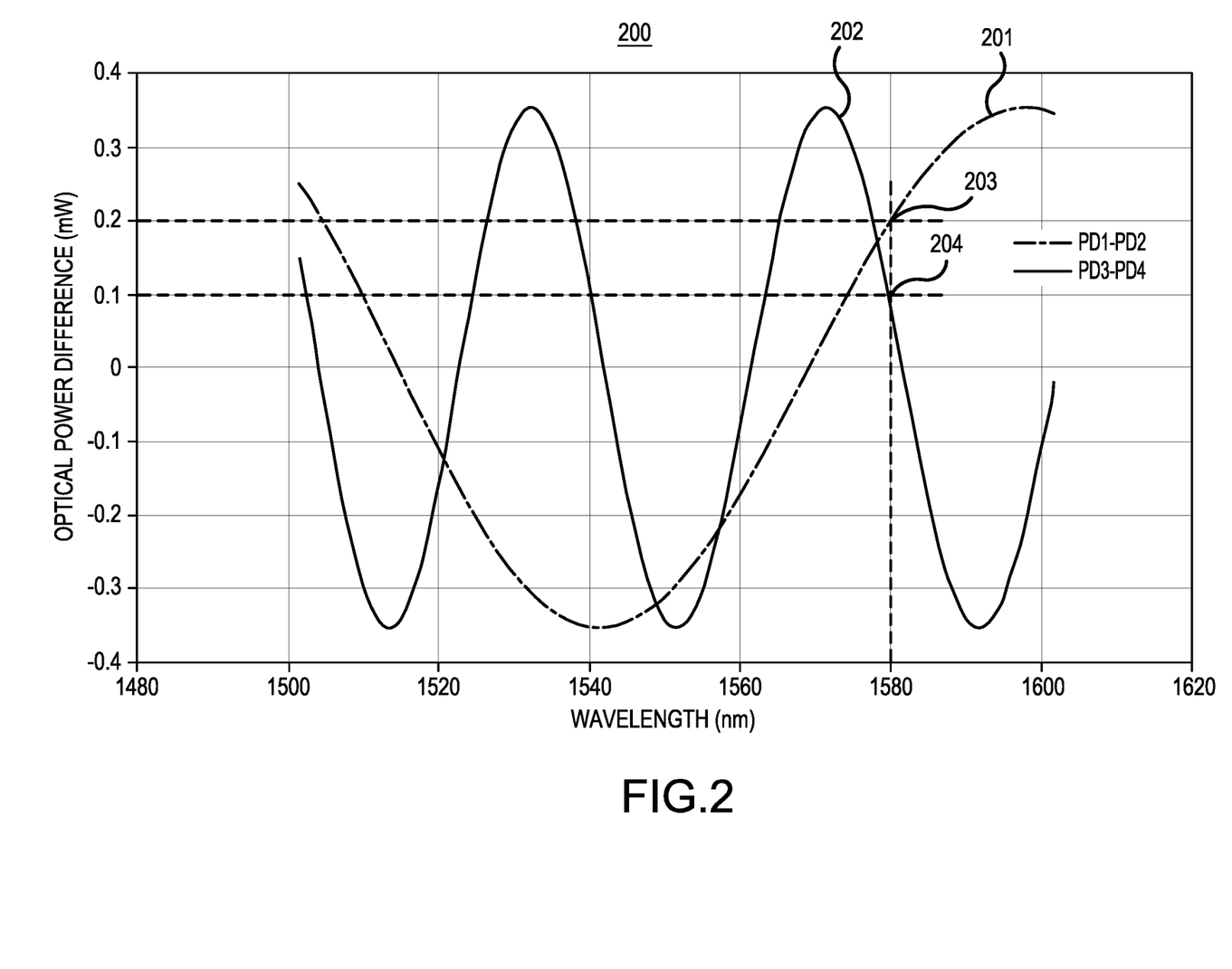
FIG. 2 is a graph of optical power versus wavelength in accordance with a representative embodiment.

FIG. 2 is a graph 200 of optical power versus wavelength in accordance with a representative embodiment. Various aspects of the wavemeter 100 described in connection with FIG. 1 are common to the description of graph 200 and may not be repeated. Moreover, various aspects of the graph 200 will be described in greater detail below in connection with the representative embodiments described in connection with FIGS. 3-4.

First curve 201 depicts the output power based on the difference signal between the first photodetector 163 and the second photodetector 164, versus wavelength. Notably, by taking the difference between the signals from first photodetector 163 and the second photodetector 164, there is no DC component of first curve 201. As will be appreciated, first curve 201 represents the spacing in optical wavelength between two successive transmitted optical intensity maxima or minima (i.e., the first FSR) of the first MZI 120 described above.

Second curve 202 depicts the output power based on the difference signal between the first photodetector 173 and the second photodetector 174, versus wavelength. Notably, by taking the difference between the signals from first photodetector 173 and the second photodetector 174, there is no DC component of second curve 202. As will be appreciated, second 202 represents the spacing in optical wavelength between two successive transmitted optical intensity maxima or minima (i.e., the second FSR) of the second MZI 130 described above.

As will be appreciated, first curve 201 has a larger spacing in optical wavelength than second 202, and thus first curve 201 has a greater FSR than the second curve. In accordance with representative embodiments, the magnitude (both absolute and relative) of first FSR (first curve 201) and the second FSR (second 202) are realized by the selection desired geometric lengths of the optical waveguides that make up the first MZI 120 and the second MZI 130. Alternatively, or additionally, the magnitudes (both absolute and relative) of first FSR (first curve 201) and the second FSR (second 202) are realized by the selection of the materials and their relative dimension to set the desired effective indices of refraction ($n_{eff}$) of the waveguides that make up the first MZI 120 and the second MZI 130. Specifically, through the selection of the lengths, and/or the materials and dimensions of the optical waveguides that make up the first MZI 120 and the second MZI 130, desired differences in the optical path lengths between the various optical waveguides that make up the first MZI 120 and the second MZI 130 enables the setting of the first FSR (first curve 201) and the second FSR (second 202).

A review of first and second curves 201, 202 reveals for each difference signal from first and second photodetectors 162, 164, and from first and second photodetectors 172, 174, each power level corresponds to a wavelength. Just by way of illustration, a power level of 0.1 mW corresponds to approximately 1510 nm and 1575 nm in first curve 201, while this power level corresponds to 1505 nm, 1525 nm, 1540 nm, 1565 nm and 1580 nm in second curve 202. Hence, the wavelength of the input optical signal at input 101 cannot be determined unambiguously based on only one of the first and second curves 201, 202.

By the present teachings, the wavelength of the optical signal provided to input 101 can be determined by measuring the difference signals (power) between first and second photodetectors 162, 164, and between first and second photodetectors 172, 174, based on the differential power measurement from the measured difference signals. By way of illustration, if the differential power signal between the first photodetector 162 and the second photodetector 164 measures 0.2 mW; and the differential power signal between the first photodetector 162 and the second photodetector 164 of the first MZI 120 measures 0.2 mW (point 203); and the differential power signal between the first photodetector 172 and the second photodetector 174 of the second MZI 130 measures 0.1 mW (point 204), the wavelength of the optical signal provided to input 101 must be 1580 nm, as this is the only wavelength that corresponds to this combination.

Notably, and as alluded to above, providing, in addition to the first MZI 120 and the second MZI 130, additional similarly configured MZIs (not shown in FIGS. 1-2), the FSRs of such additional MZIs can be determined. These additional FSRs, which are different from the FSRs of the first and second MZIs 120, 130, and from each other, additional power data versus wavelength can be determined. This allows for three or more sets of differential power signals/wavelengths can be used to provide a more accurate determination of the wavelength of the optical signal provided to input 101. Stated somewhat differently, graph 200 provides two sets of differential power/wavelengths, and thus the resolution and the unambiguous wavelength range is limited to that which can be determined based on the two sets of differential power/wavelengths. Adding a third (or more) set of differential power/wavelength data allows each wavelength to be determined more accurately or has a larger unambiguous wavelength, or both, since each determined wavelength will require three (or more) data sets to be determined.

In accordance with a representative embodiment, the data from first curve 201 and second curve can be stored in memory 184 in the controller 180 shown in FIG. 1. During a measurement of the wavelength of an optical signal provided at the input 101, measurement data are received from the first and second subtractors 166, 176 by the processor 182 of the controller 180. As noted above, memory 184 stores instructions, and processor 182 that executes the instructions. When executed by the processor 182, the instructions cause the controller 180 implement a process of comparing the first and second difference signals (power) from the first and second subtractors 166, 176 with first and second difference values stored in the memory 184. Based on the comparing, the processor 182 determines an output wavelength of the light source that provides the input optical signal to the input 101. Again, the use of two MZIs is merely illustrative. By providing a third (or more) MZIs with a third (or more) FSRs using principles of the present teachings, additional difference power signals from the third (or more) subtractors (not shown in FIGS. 1-2) can be added to increase the resolution or the unambiguous wavelength range, or both of the measurement of the wavelength of the optical signal provided by an optical source (not shown) to the input 101.

Figure 3:
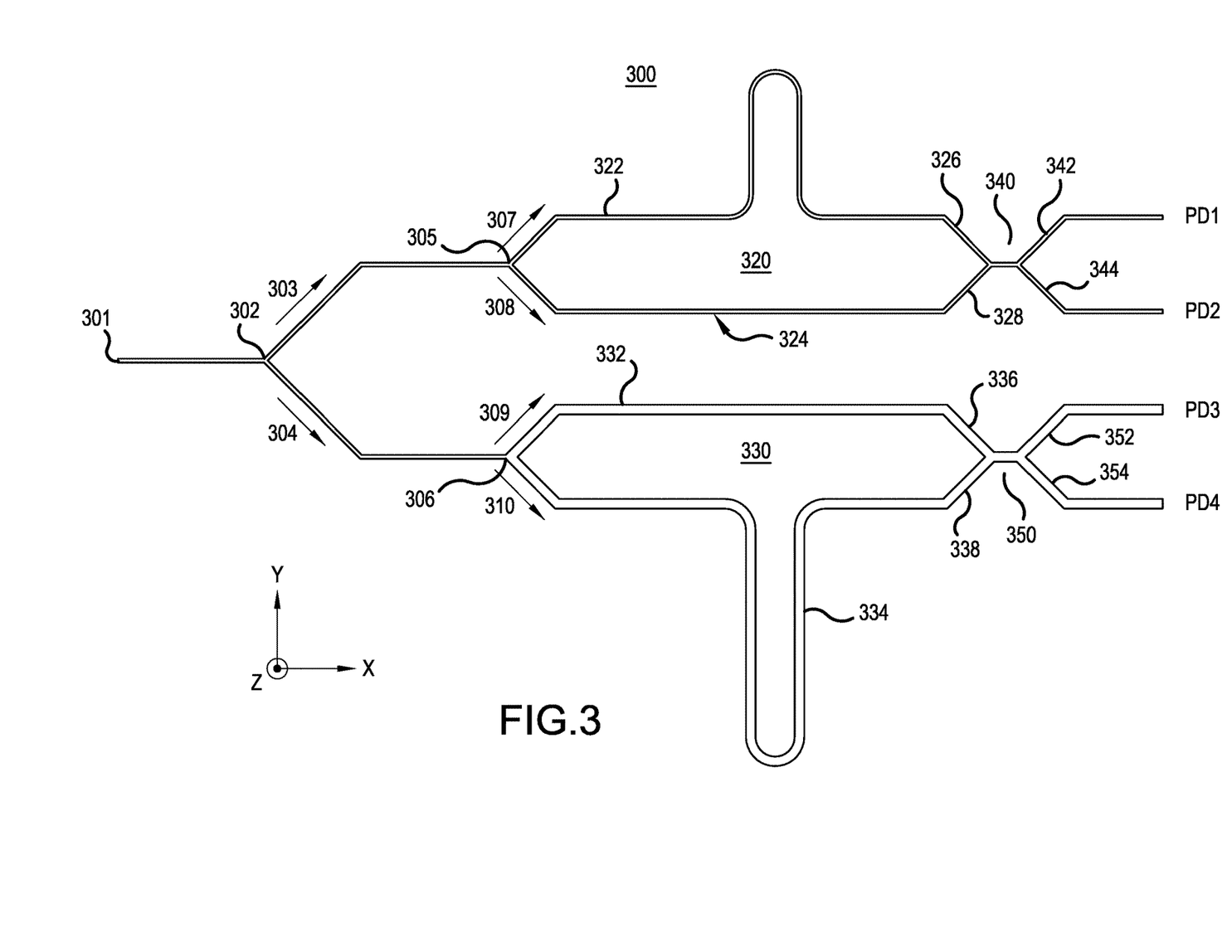
FIG. 3 is a top view of an optical wavemeter in accordance with a representative embodiment.

FIG. 3 is a top view of an optical wavemeter 300 in accordance with a representative embodiment. Notably, and as will become clearer from a review of the description of the representative embodiments described in connection with FIG. 4, the optical wavemeter 300 is a PIC.

Among other benefits, the PIC optical wavemeter of the representative embodiments is more stable than a bulk-optic solution when exposed to environmental factors such as temperature-changes, changes in ambient pressure or composition of the media between the bulk-optical elements, shock, and vibration because the optical signals traversing the optical wavemeter 300 are guided within the chip rather than through several bulk-optic components. By contrast, bulk optical elements could, for example, move with respect to each other when the bulk optical wavemeter is dropped. Alternatively, the refractive index of air and the bulk-optic components might change differently when temperature changes and have an unpredictable impact on the FSR of the MZI in which they are disposed.

Many aspects of representative embodiments described in connection with FIGS. 1 and 2 are common to the description of optical wavemeter 300. Moreover, various aspects of the optical wavemeter 300 will be described below in connection with the representative embodiment described in connection with FIG. 4.

An input optical signal is provided to an input 301 as shown. A first optical splitter 302 is adapted to split the power of the input optical signal into a first optical signal 303 and a second optical signal 304, having equal power. As such, the first optical splitter is a 50:50 optical splitter.

The first optical signal 303 is then incident on a second optical splitter 305, and the second optical signal 304 is incident on a third optical splitter 306. Like the first optical splitter 302, the second and third optical splitters 305, 306 are each 50:50 splitters, and as such, the input optical signal is again equally split by the second and third optical splitters 305, 306. The second optical splitter 305 provides a first output optical signal 307 and a second output optical signal 308. Similarly, the third optical splitter 306 provides a third output optical signal 309 and a fourth output optical signal 310. As will be appreciated, neglecting power loss in optical waveguides and couplers, each of the first, second, third and fourth optical output signals have one-fourth of the optical power of the input optical signal provided to the input 301.

The first output optical signal 307 is received at a first port of a first arm 322 of a first Mach-Zehnder interferometer (MZI) 320; and the second output optical signal 308 is received at a second port of a second arm 324 of the first MZI 320.

Similarly, the third output optical signal 309 is received at a first port of a first arm 332 of a second Mach-Zehnder interferometer (MZI) 330; and the fourth output optical signal is received at a second port of a second arm 334 of the second MZI 330.

A first output 326 and a second output 328 are provided from the first and second arms 322, 324 of the first MZI 320 to first and second inputs of a first signal combiner 340, which provides a first output 342 to a first photodetector PD1 and a second output 344 to a second photodetector PD2.

A first output 336 and a second output 338 are provided from the first and second arms 332, 334 of the second MZI 330 to first and second inputs of a second signal combiner 350, which provides a first output 352 to a third photodetector PD3 and a second output 354 to a fourth photodetector PD4.

In a manner described more fully above, the outputs of the photodetectors PD1, PD2, PD3 and PD4 are provided to respective subtractors (not shown in FIG. 3), and difference signals (power) are provided in to a controller (not shown in FIG. 3) for further processing as described above.

The first MZI 320 has a first free-spectral range (FSR), and the second MZI 330 has a second free spectral range, which is different than the first FSR of the first MZI 320. In accordance with a representative embodiment the FSRs of the first and second MZIs 320, 330 are realized by providing a first effective index of refraction for the first MZI 320, and a second effective index of refraction for the second MZI 330, which is not the same as the first effective index of refraction. There are various ways contemplated by the present teachings to provide a desired difference in the first effective index of refraction for the first MZI 320, and a second effective index of refraction for the second MZI 330. One way of providing the desired effective indices of refraction is by selection of the dimensions (width—y-direction in the coordinate system of FIG. 3) and height (+z-direction in the coordinate system of FIG. 3) of the cores of the optical waveguides that make up the first and second MZIs 320, 330. To this end, and as will become clearer through the description of the representative embodiments described in connection with FIG. 4, each optical waveguide has a core and a cladding. When the width, or a height, or both of a core in one MZI is greater than a width, or height, or both, of another MZI, a smaller fraction of the electromagnetic field profile of the guided mode overlaps the cladding, and more overlaps the core. This results in a comparatively higher effective index of refraction for the mode traversing the wider and/or taller core.

It can be shown that the FSR of an MZI is given by:

$$FSR = \frac{\lambda^2}{2 * n_{eff} \Delta L}$$

where $\lambda$ is the wavelength of the optical signal traversing the MZI, $n_{eff}$ is the effective index of refraction of the waveguides (at wavelength $\lambda$) of the first and second arms of the MZI, and $\Delta L$ is the difference in the geometric length of the optical waveguide in the first arm and the waveguide of the second arm of the MZI.

Just by way of illustration, optical waveguides in the first MZI 320 illustratively have a width of 400 nm provides first curve 201 in FIG. 2; whereas the optical waveguides of the second MZI 330 has a width of 550 nm and provides second 202 in FIG. 2. As such, by selecting the width of the optical waveguides in the first MZI 320 to smaller than the width of the optical waveguides of the second MZI 330, the effective index of refraction of the first MZI 320 is smaller than effective index of refraction of the second MZI 330. From the equation above, the first MZI has a greater FSR (as shown in first curve 201) than the second MZI 330 (as shown in second 202).

The selection of differing widths and/or height for the waveguides in each MZI are illustrative ways to provide different effective indices of refraction in each MZI, and as a result are ways to provide MZIs with different FSRs in a PIC. Alternatively, materials used for the core and cladding of the waveguides of respective MZIs can be selected to provide different effective indices of refraction for waveguides that form the MZI. For example, the core/cladding for the optical waveguides of representative embodiments can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

In addition, or instead of the providing different effective indices of refraction, the first MZI 320 may have a first geometric optical length (i.e., physical length) and the second MZI 330 may have a second geometric optical length, which is different than the first geometric optical length. To this end, as can be seen the geometric optical length of first arm 322 of the first MZI 320 is greater than the geometric optical length of second arm 324 of the first MZI 320. As such, the FSR of the first MZI 320 is a first value. Similarly, the geometric optical length of first arm 332 of the second MZI 330 is greater than the geometric optical length of second arm 334 of the second MZI 330. As will be appreciated from the equation above, the FSR of an MZI can be increased by decreasing the geometric optical path length difference between the first and second arms of the MZI. Increasing the geometric optical path length difference will lead to a smaller FSR.

Figure 4:
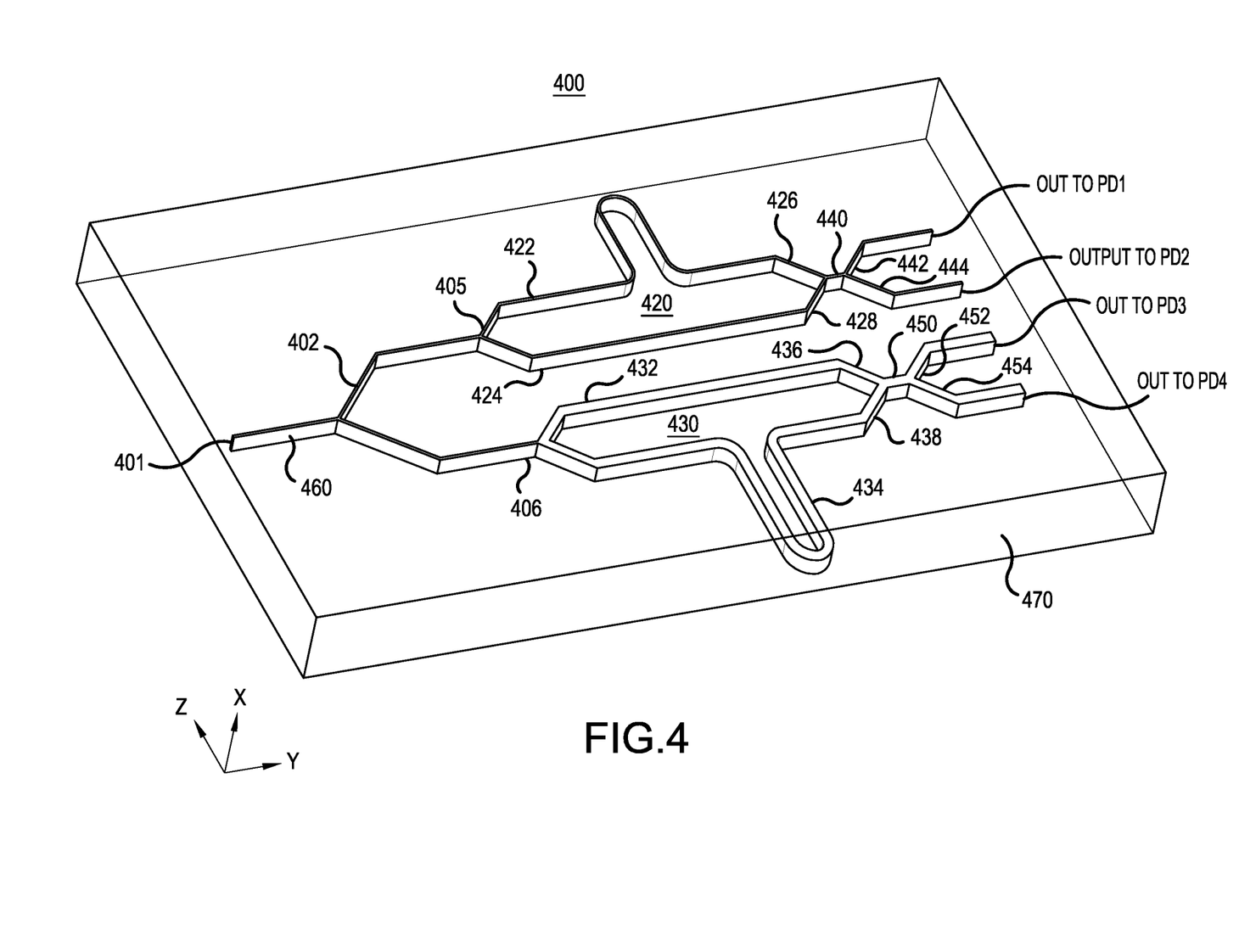
FIG. 4 is a perspective view of the optical waveguide according to the representative embodiment of FIG. 3.

FIG. 4 is a perspective view of an optical wavemeter 400 in accordance with a representative embodiment. As will be appreciated, the optical wavemeter 400 is a PIC.

Among other benefits, the PIC optical wavemeter of the representative embodiments are is more stable than a bulk-optic solution when exposed to environmental factors such as temperature-changes, shock, and vibration because the optical signals traversing the optical wavemeter 400 are guided within the chip rather than through several bulk-optic components. By contrast, bulk optical elements can move could, for example, move with respect to each other when the bulk optical wavemeter is dropped. Alternatively, the refractive index of air and the bulk-optic components might change differently when temperature changes and have an unpredictable impact on the FSR of the MZI in which they are disposed.

Many aspects of representative embodiments described in connection with FIGS. 1-3 are common to the description of optical wavemeter 400 and may not be repeated.

An input optical signal is provided to an input 401 as shown. A first optical splitter 402 is adapted to split the power of the input optical signal into a first optical signal 403 and a second optical signal 404, having equal power. As such, the first optical splitter is a 50:50 optical splitter.

The first optical signal 403 is then incident on a second optical splitter 405, and the second optical signal 404 is incident on a third optical splitter 406. Like the first optical splitter 402, the second and third optical splitters 405, 406 are each 50:50 splitters, and as such, the input optical signal is again equally split by the second and third optical splitters 405, 406. As will be appreciated, neglecting power loss in optical waveguides and couplers, each of the first, second, third and fourth optical output signals have one-fourth of the optical power of the input optical signal provided to the input 401.

The first output optical signal 407 is received at a first port of a first arm 422 of a first Mach-Zehnder interferometer (MZI) 420; and the second output optical signal 408 is received at a second port of a second arm 424 of the first MZI 420.

Similarly, the third output optical signal 409 is received at a first port of a first arm 432 of a second Mach-Zehnder interferometer (MZI) 430; and the fourth output optical signal is received at a second port of a second arm 434 of the second MZI 430.

A first output 426 and a second output 428 are provided from the first and second arms 422, 424 of the first MZI 420 to first and second inputs of a first signal combiner 440, which provides a first output 442 to a first photodetector PD1 and a second output 444 to a second photodetector PD2.

A first output 436 and a second output 438 are provided from the first and second arms 432, 434 of the second MZI 430 to first and second inputs of a second signal combiner 450, which provides a first output 452 to a third photodetector PD3 and a second output 454 to a fourth photodetector PD4.

In a manner described more fully above, the outputs of the photodetectors PD1, PD2, PD3 and PD4 are provided to respective subtractors (not shown in FIG. 3), and difference signals (power) are provided in to a controller (not shown in FIG. 3) for further processing as described above.

The first MZI 420 has a first free-spectral range (FSR), and the second MZI 430 has a second free spectral range, which is different than the first FSR of the first MZI 420. In accordance with a representative embodiment the FSRs of the first and second MZIs 420, 430 are realized by providing a first effective index of refraction for the first MZI 420, and a second effective index of refraction for the second MZI 430, which is not the same as the first effective index of refraction. There are various ways contemplated by the present teachings to provide a desired difference in the first effective index of refraction for the first MZI 420, and a second effective index of refraction for the second MZI 430.

As will be appreciated, the optical wavemeter 400 comprises a series of connected optical waveguides as described herein. In accordance with a representative embodiment, the optical waveguides in the wavemeter are strip waveguides which consist of a channel (core) made of a material having a higher index of refraction disposed in/surrounded by a material (cladding) having a lower index of refraction than the channel. In accordance with a representative embodiment, the waveguides of the optical wavemeter 400 may comprise a core 460, which is illustratively silicon, disposed in a cladding 470 of silicon dioxide, which may be disposed on a silicon substrate. As noted above, the optical wavemeter 400 of various embodiments may be implemented in any material system in which a waveguide can be built. For example, as noted above, the core 460/cladding 470 for the strip waveguide can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

As noted above, one way of providing the desired effective indices of refraction is by selection of the dimensions (width—z-direction in the coordinate system of FIG. 4) and height (+x-direction in the coordinate system of FIG. 4) of the cores of the optical waveguides that make up the first and second MZIs 420, 430. To this end, and as will become clearer through the description of the representative embodiments described in connection with FIG. 4, each optical waveguide has a core and a cladding. When the width, or a height, or both of a core in one MZI is greater than a width, or height, or both, of another MZI, less energy of the guided mode overlaps the cladding, and more overlaps the core. This results in a comparatively higher effective index of refraction for the mode traversing the wider and/or taller core.

Just by way of illustration, optical waveguides in the first MZI 420 illustratively have a width of 400 nm provides first curve 201 in FIG. 2; whereas the optical waveguides of the second MZI 430 has a width of 550 nm and provides second 202 in FIG. 2. As such, by selecting the width of the optical waveguides in the first MZI 420 to smaller than the width of the optical waveguides of the second MZI 430, the effective index of refraction of the first MZI 420 is smaller than effective index of refraction of the second MZI 430. From the equation above, the first MZI has a greater FSR (as shown in first curve 201) than the second MZI 430 (as shown in second 202).

The selection of differing widths and/or height for the waveguides in each MZI are illustrative ways to provide different effective indices of refraction in each MZI, and as a result are ways to provide MZIs with different FSRs in a PIC. Alternatively, materials used for the core and cladding of the waveguides of respective MZIs can be selected to provide different effective indices of refraction for waveguides that form the MZI. For example, the core disposed in the cladding for the optical waveguides of representative embodiments can be combinations of silicon (Si), silicon dioxide ($SiO_2$), silicon nitride ($Si_3N_4$); or doped indium phosphide (InP) and in undoped indium phosphide. These material systems are merely illustrative, and other materials systems may be incorporated without departing from the scope of the present teachings.

In addition, or instead of the providing different effective indices of refraction, the first MZI 420 may have a first geometric optical length (i.e., physical length) and the second MZI 430 may have a second geometric optical length, which is different than the first geometric optical length. To this end, as can be seen the geometric optical length of first arm 422 of the first MZI 420 is greater than the geometric optical length of second arm 424 of the first MZI 420. As such, the FSR of the first MZI 420 is a first value. Similarly, the geometric optical length of first arm 432 of the second MZI 430 is greater than the geometric optical length of second arm 434 of the second MZI 330. Again, as will be appreciated from the equation above, the FSR of an MZI can be increased by decreasing the geometric optical path length difference between the first and second arms of the MZI. Increasing the geometric optical path length difference will lead to a smaller FSR.

Figure 5:
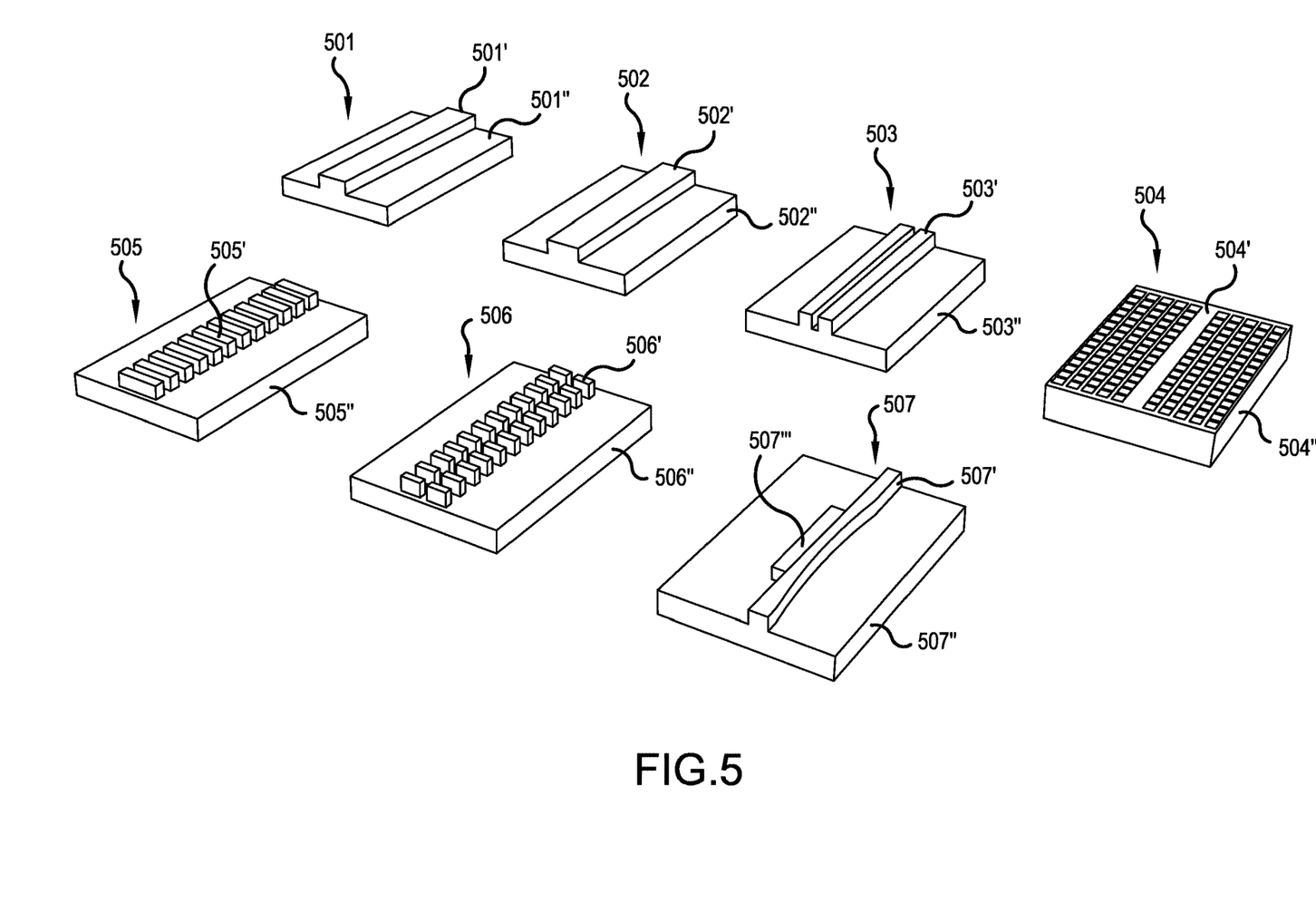
FIG. 5 shows perspective views of illustrative types of optical waveguides contemplated for use in connection with various representative embodiments.

FIG. 5 shows perspective views of illustrative types of optical waveguides contemplated for use in connection with various representative embodiments. Again, many aspects of representative embodiments described in connection with FIGS. 1-4 are common to the description of the optical waveguides of representative embodiments of FIG. 5, and may not be repeated.

At the outset, each of the optical waveguides 501, 502, 503, 504, 505, 506, and 507, comprise cores that are disposed over a suitable cladding material. Additional cladding material that is contemplated to be disposed over and on sides of each of the cores of optical waveguides 501~507 is not shown to foster a better view of the respective cores. So, with reference to FIG. 4, the cladding material would substantially surround the respective cores, like cladding 470 of FIG. 4 substantially surrounds core 460. Moreover, as noted above, the cores and claddings of the optical waveguides 501, 502, 503, 504, 505, 506, and 507 can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

FIG. 5 depicts a strip optical waveguide 501 comprising a core 501' and disposed over a cladding 501".

Another contemplated optical waveguide is rib optical waveguide 502, comprising a core 502' and disposed over a cladding 503".

Another contemplated optical waveguide is slot optical waveguide 503, comprising two cores 503' that are filled with a third material and disposed over a cladding 503".

Another contemplated optical waveguide is photonic crystal waveguide optical waveguide 504, comprising a core 504' and disposed over a cladding 504".

Another contemplated optical waveguide is subwavelength grating (SWG) optical waveguide 505, comprising a core 505' and disposed over a cladding 505".

Another contemplated optical waveguide is SWG slot waveguide optical waveguide 506, comprising a core 506' and disposed over a cladding 506".

Another contemplated optical waveguide is surface plasmon polariton (SPP) slot optical waveguide 507, comprising a core 507' disposed adjacent to metal layer 507''' and disposed over a cladding 507".

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A photonic integrated circuit (PIC) for determining a wavelength of an input signal, the PIC comprising:
   a substrate;
   a first Mach-Zehnder Interferometer (MZI) disposed over the substrate, comprising first optical waveguides having a first effective index of refraction and configured to receive a first output optical signal from a light source; and
   a second Mach-Zehnder Interferometer (MZI) disposed over the substrate, comprising second optical waveguides having a second effective index of refraction, which is greater than the first effective index of refraction, and configured to receive a second output optical signal from the light source, wherein the first MZI has a first optical path length (OPL) difference, and the second MZI has a second optical path length (OPL) difference, which is greater than the first OPL difference.

2. The PIC of claim 1, wherein the first optical waveguides have a first core width, the second optical waveguides have a second core width, and the second core width is greater than the first core width.

3. The PIC of claim 1, wherein the first optical waveguides have a first core height, the second optical waveguides have a second core height, and the second core height is greater than the first core height.

4. The PIC of claim 2, wherein the first and second optical waveguides are each one of a strip optical waveguide, a rib optical waveguide, a slot optical waveguide, a photonic crystal optical waveguide, a subwavelength grating (SWG) optical waveguide, a slot SWG optical waveguide, and a surface plasmon polariton slot optical waveguide.

5. The PIC of claim 4, wherein the first and second optical waveguides are different from one another.

6. The PIC of claim 3, wherein the first and second optical waveguides are each one of a strip optical waveguide, a rib optical waveguide, a slot optical waveguide, a photonic crystal optical waveguide, a subwavelength grating (SWG) optical waveguide, a slot SWG optical waveguide, and a surface plasmon polariton slot optical waveguide.

7. The PIC of claim 6, wherein the first and second optical waveguides are different from one another.

8. The PIC of claim 1, wherein geometric length difference of the arms of the first MZI is not the same as the geometric length difference of the arms of the second MZI.

9. The PIC of claim 8, wherein the first optical waveguides comprise a first core and a first cladding, the first core comprising one of silicon (Si) or germanium (Ge), and indium phosphide, and the first cladding comprising one of silicon dioxide ($SiO_2$), silicon nitride ($Si_3N_4$), and indium phosphide (InP).

10. The PIC of claim 1, wherein the second optical waveguides comprise a second core substantially surrounded by a second cladding, wherein an index of refraction of the second core is greater than an index of refraction of the second cladding.

11. The PIC of claim 10, wherein the second core comprises silicon (Si) and the first cladding comprises one of silicon dioxide ($SiO_2$), silicon nitride ($Si_3N_4$), and indium phosphide (InP).

12. The PIC of claim 1, further comprising:
    a first photodetector and a second photodetector, wherein a first difference signal is provided based on first outputs of the first MZI; and
    a third photodetector and a fourth photodetector, wherein a second difference signal is provided based on second outputs of the second MZI, wherein the first and second difference signals are used to determine an output wavelength of the light source.

13. An optical wavemeter for determining an optical wavelength of a light source, the optical wavemeter comprising:
    a substrate;
    a first Mach-Zehnder Interferometer (MZI) disposed over the substrate, comprising first optical waveguides having a first optical path length difference, and configured to receive a first output optical signal from a light source; a second Mach-Zehnder Interferometer (WI) disposed over the substrate, comprising second optical waveguides having a second optical path length difference, which is greater than the first optical path length difference, and configured to receive a second output optical signal from the light source, wherein: the first optical waveguides have a first core width, the second waveguides have a second core width, and the second core width is greater than the first core width; or the first optical waveguides have a first core height, the second waveguides have a second core height, and the second core height is greater than the first core height;
    a first photodetector and a second photodetector, wherein a first difference signal is provided based on first outputs of the first MZI;
    a third photodetector and a fourth photodetector, wherein a second difference signal is provided based on second outputs of the second MZI; and
    a controller comprising a memory that stores instructions, and a processor that executes the instructions, wherein, when executed by the processor, the instructions cause the controller to implement a process, comprising:
    comparing the first and second difference signals with first and second difference values stored in the memory, and, based on the comparing, determining an output wavelength of the light source.

14. The system of claim 13, wherein the first and second optical waveguides are each one of a strip optical waveguide, a rib optical waveguide, a slot optical waveguide, a photonic crystal optical waveguide, a subwavelength grating (SWG) optical waveguide, a slot SWG optical waveguide, and a surface plasmon polariton slot optical waveguide.

15. A photonic integrated circuit (PIC) for determining a wavelength of an input signal, the PIC comprising:
- a substrate;
- a first Mach-Zehnder Interferometer (MZI) disposed over the substrate, comprising first optical waveguides having a first optical path length difference, and configured to receive a first output optical signal from a light source; and
- a second Mach-Zehnder Interferometer (MZI) disposed over the substrate, comprising second optical waveguides having a second optical path length difference, which is greater than the first optical path length difference, and configured to receive a second output optical signal from the light source wherein the first optical waveguides have a first index of refraction and the second waveguides have a second index of refraction, which is different than the first index of refraction.

16. The PIC of claim 15, wherein the first optical waveguides have a first core width, the second optical waveguides have a second core width, and the second core width is greater than the first core width.

17. The PIC of claim 15, wherein the first optical waveguides have a first core height, the second optical waveguides have a second core height, and the second core height is greater than the first core height.

18. The PIC of claim 17, wherein the first and second optical waveguides are each one of a strip optical waveguide, a rib optical waveguide, a slot optical waveguide, a photonic crystal optical waveguide, a subwavelength grating (SWG) optical waveguide, a slot SWG optical waveguide, and a surface plasmon polariton slot optical waveguide.

19. The PIC of claim 15, wherein the first optical waveguides each have a first core and a first cladding have first indices of refraction, and the second optical waveguides each have a second core and a second cladding have second effective indices of refraction, which are different than the first effective indices of refraction.

* * * * *

UNITED STATES PATENT AND TRADEMARK OFFICE
CERTIFICATE OF CORRECTION

PATENT NO. : 11,536,610 B2
APPLICATION NO. : 16/943056
DATED : December 27, 2022
INVENTOR(S) : Marcel Zeiler et al.

It is certified that error appears in the above-identified patent and that said Letters Patent is hereby corrected as shown below:

In the Claims

In Column 14, Line 36, in Claim 13, delete "(WI)" and insert -- (MZI) --.

In Column 15, Line 14, in Claim 15, delete "source" and insert -- source, --.

Signed and Sealed this
Twentieth Day of June, 2023

Katherine Kelly Vidal
*Director of the United States Patent and Trademark Office*